Oct. 30, 1951                F. WEISS               2,573,123
APPARATUS AND PROCEDURE FOR FILLING
ELECTRICAL CAPACITORS AND THE LIKE
Filed Jan. 7, 1948                         12 Sheets-Sheet 1

INVENTOR
FELIX WEISS
BY
W. D. Keith
ATTORNEY

INVENTOR
FELIX WEISS
BY
W. D. Keith
ATTORNEY

Oct. 30, 1951 — F. WEISS — 2,573,123
APPARATUS AND PROCEDURE FOR FILLING
ELECTRICAL CAPACITORS AND THE LIKE
Filed Jan. 7, 1948 — 12 Sheets-Sheet 5

INVENTOR
FELIX WEISS
BY
W. D. Keith
ATTORNEY

INVENTOR
FELIX WEISS
BY
W. D. Keith
ATTORNEY

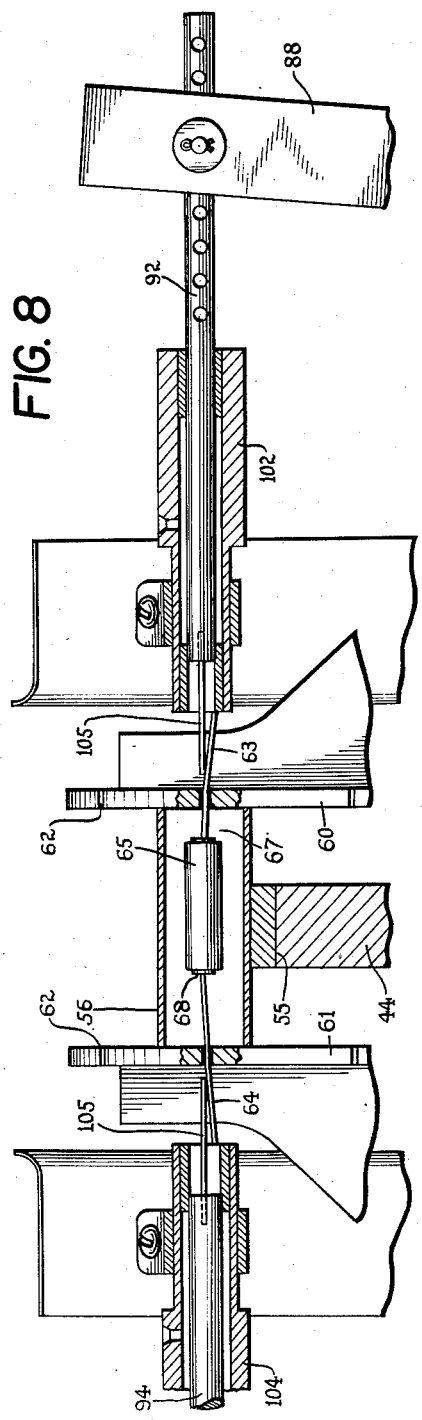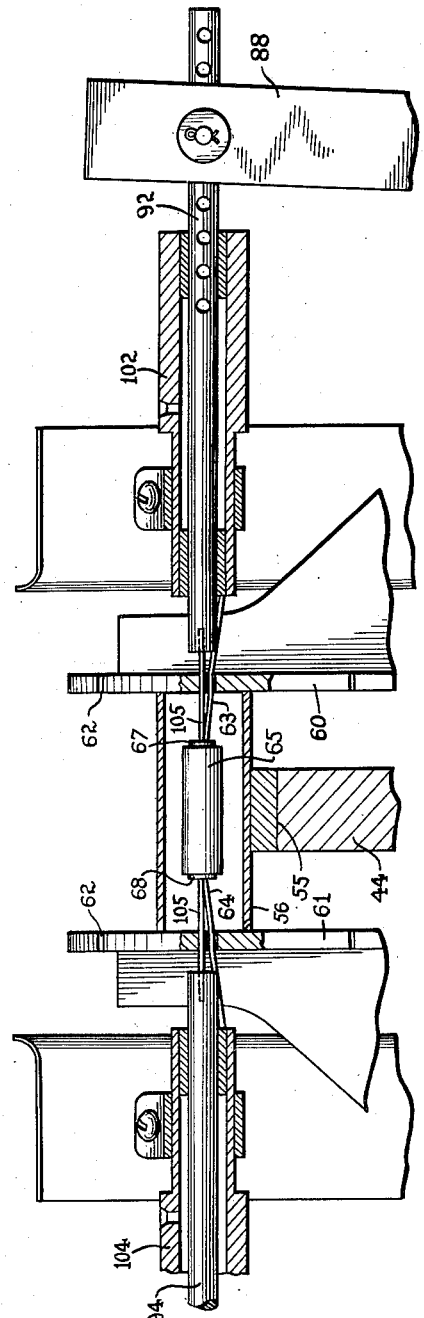

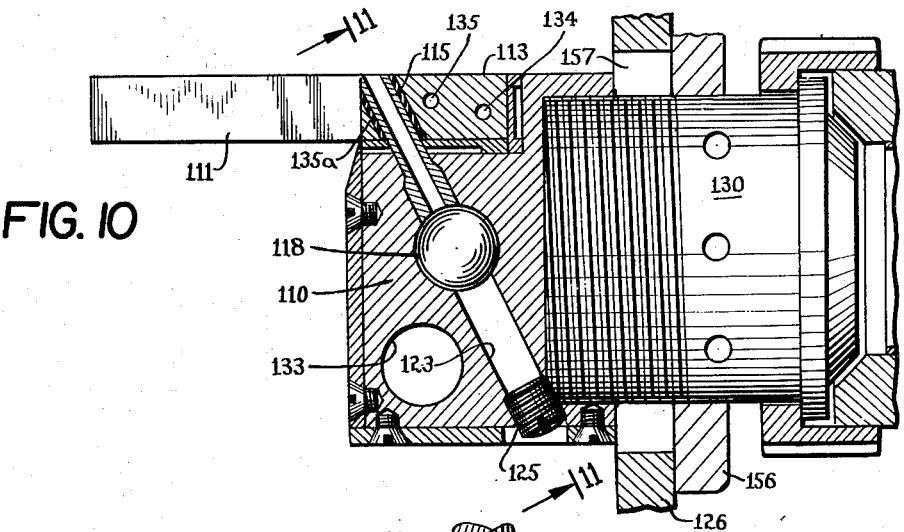
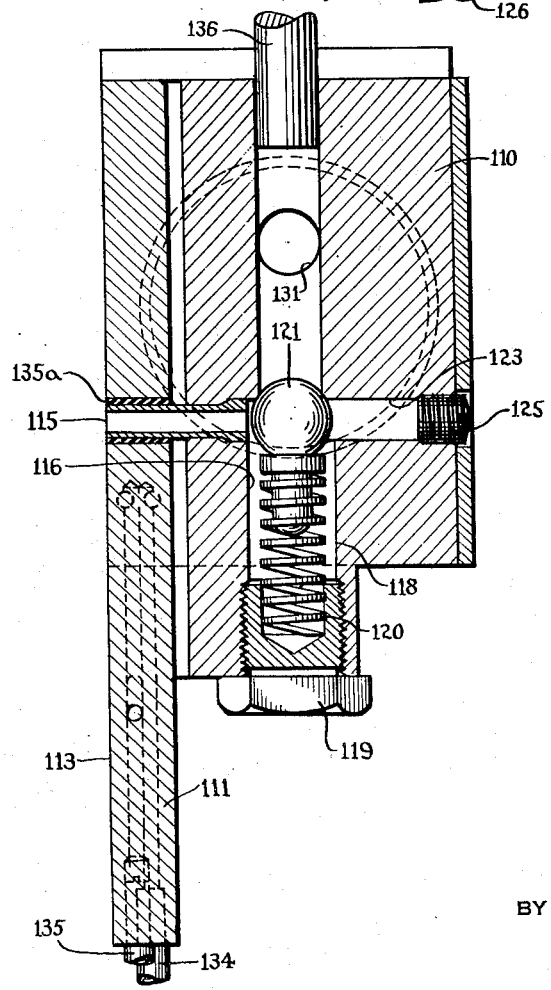

Oct. 30, 1951 F. WEISS 2,573,123
APPARATUS AND PROCEDURE FOR FILLING
ELECTRICAL CAPACITORS AND THE LIKE
Filed Jan. 7, 1948 12 Sheets-Sheet 10

INVENTOR
FELIX WEISS
BY W. D. Keith
ATTORNEY

INVENTOR
FELIX WEISS
BY
W. D. Keith
ATTORNEY

Oct. 30, 1951     F. WEISS     2,573,123
APPARATUS AND PROCEDURE FOR FILLING
ELECTRICAL CAPACITORS AND THE LIKE
Filed Jan. 7, 1948     12 Sheets-Sheet 12

INVENTOR
FELIX WEISS
BY
W. D. Keith
ATTORNEY

Patented Oct. 30, 1951

2,573,123

UNITED STATES PATENT OFFICE 2,573,123

APPARATUS AND PROCEDURE FOR FILLING ELECTRICAL CAPACITORS AND THE LIKE

Felix Weiss, Brookline, Mass., assignor to Cornell-Dubilier Electric Corporation, South Plainfield, N. J., a corporation of Delaware Application January 7, 1948, Serial No. 922

19 Claims. (Cl. 18—5)

This invention relates to the filling of hollow articles with fluid material and is especially designed to provide improved machines for introducing into containers, molds or the like, a plastic substance, e. g. a composition which when introduced is of a fluid or semi-fluid nature and which may subsequently harden into a solid or at least semi-solid condition by cooling, setting or other treatment. In an important aspect, the present improvements relate to apparatus for sealing the interior or open end or ends of casings containing electrical parts, an important feature of the invention being the provision of means for introducing plastic material under pressure into such containers so as to seal the contents against access of air, moisture or the like, as well as to hold the enclosed parts and their leads in place.

A particularly useful embodiment of the invention is designed for filling the open ends of so-called tubular capacitors, i. e. electrical condensers housed in cardboard or other tubes which are to be sealed against undesired influences by a layer of wax or other composition.

It will be understood that an electrical condenser (such term being herein synonymous with "capacitor") may essentially comprise a pair of electrodes or so-called plates which are insulated from each other but are arranged in closely spaced relation and have a large surface area, such as can be obtained by making the electrodes of thin, conductive material and rolling or folding them, when separated by an insulating layer, into as compact an arrangement as possible.

For example, an extremely common type of capacitor, widely used in radio, electronic and other electrical equipment, comprises essentially two elongated strips of metal foil between which an insulating dielectric material is sandwiched, e. g. one or more sheets of thin paper impregnated with a suitable dielectric composition such as oil or wax. The usual practice is to wind the sandwiched foil and paper into a convolute roll, the strips of foil for the respective electrodes being arranged in a staggered relation transversely of their length, i. e. axially of the resulting roll. Thus one strip of foil may have its entire longitudinal edge projecting from one end of the roll with its other edge spaced inwardly of the other end, while the other strip of foil may correspondingly project from the other end of the roll and have its opposite edge spaced from the first mentioned end. In this way there is ample insulating margin for both strips at the ends of the roll, and the projecting turns or edges of foil at each end may be connected to an appropriate wire lead, or to a flat, spiral-wound portion of such a lead, as by soldering. The resulting structure constitutes a generally cylindrical body with a terminal wire extending from each end, for the corresponding plate of the condenser.

To protect such a device from deteriorating influences of air and moisture and from mechanical injury it is the usual practice to insert the roll in a cardboard tube and then to seal the open ends of the latter with molten wax which solidifies on cooling. The lead wires project through the wax plugs and beyond them, often to a considerable length. A condenser manufactured and housed in this manner is commonly called a tubular capacitor.

Heretofore considerable difficulty has been encountered in filling the open or hollow ends of the housing tubes with wax, and the difficulty is not one that can be overcome with ordinary filling machinery designed for other purposes. For example, many tubular capacitors are housed in such small cardboard tubes that it is practially impossible to pour the molten wax into the minute cavity or void bounded by the end portion of the tube and the adjacent end of the enclosed condenser section. With both large and small devices the filling operations have also been troublesome in that even if one end of the tube can be properly sealed, it is hard to pour molten wax effectively into the opposite end. Air is very likely to be trapped in the tube, and then, particularly after it expands because of the heat of the molten wax being poured, tries to escape through the latter. In consequence air bubbles are produced in the fluid material, and although they may almost escape, they are likely to be caught and remain in the wax upon solidification. The resulting air pockets or cavities not only impair the electrical utility of the condenser for many purposes but may even break and destroy the seal. Finally, the presence of the wire lead extending out through each open end of the cardboard tube makes it harder to obtain a completely effective seal. The wires are neither limp enough to be held by soft wax nor rigid enough to resist casual displacement, and it is very difficult to keep them centered while simultaneously pouring the wax, and also while the latter hardens.

Accordingly an important object of the present invention is to provide improved apparatus and procedure for filling one or more ends of condenser tubes or the like with thermoplastic material, in such fashion as to overcome or minimize the difficulties mentioned above. A more general object is to afford improved, more efficient and yet essentially simple apparatus for introducing fluid material in a hollow article, as an automatic operation and preferably with the fluid under pressure to assure its full penetration and the avoidance of pockets or bubbles of air. Other specific objects include novel and peculiarly effective arrangements for holding the articles, for advancing them to and from a filling station in the machine, and for introducing the sealing composition, usually in a fluid form.

Additional objects are to provide improved means for feeding the fluid into the hollow portion of the article, affording a rapid and complete filling operation and further embracing features of adjustability whereby the amount of material to be inserted is readily preselected. Still further objects include the provision of faster, more reliable and efficient machinery of the character stated, having a cooperating driving motor whereby the several carrying, feeding and like operations are automatically performed in a thoroughly satisfactory manner.

Another object is the provision, in such apparatus, of means for preliminary positioning the enclosed body, e. g. the actual condenser section within a cardboard tube, at an intended locality relative to its surrounding tube or other housing; and a particularly important object related chiefly to apparatus for such operations on tubular capacitors or the like is to provide support of the projecting wires in a desired fashion and without hindrance to the filling step.

To these and other ends an advantageous embodiment of the invention is illustrated in the drawings and described hereinbelow, it being believed that such disclosure will serve, by way of illustrative example, to explain the several features and principles underlying the present improvements.

Referring to the drawings:

Figs. 8 and 9 are fragmentary vertical sections on line 8—8 of Fig. 2, the positioning rods being respectively shown in retracted and advanced locations;

Fig. 10 is a fragmentary horizontal section on line 10—10 of Fig. 6;

Fig. 11 is a vertical section on line 11—11 of Fig. 10;

As indicated above, the illustrated example is a machine designed for introducing a thermoplastic material, e. g. molten wax, into both ends of a tubular capacitor comprising a cardboard tube enclosing a condenser unit of cylindrical shape somewhat shorter than the tube and having projecting lead wires of considerable length at each end. The machine is adapted to be loaded with successive capacitor assemblies, to advance the assemblies to a filling station where the wax is applied and then to carry the sealed and completed capacitors, while cooling them to harden the wax, to a locality of discharge or removal. The machine is automatic and is susceptible of ready adjustment in various respects as hereinafter noted, to vary its speed of operation, to change the amount of wax introduced in each capacitor, and to accommodate capacitors of different sizes.

Figure 1:
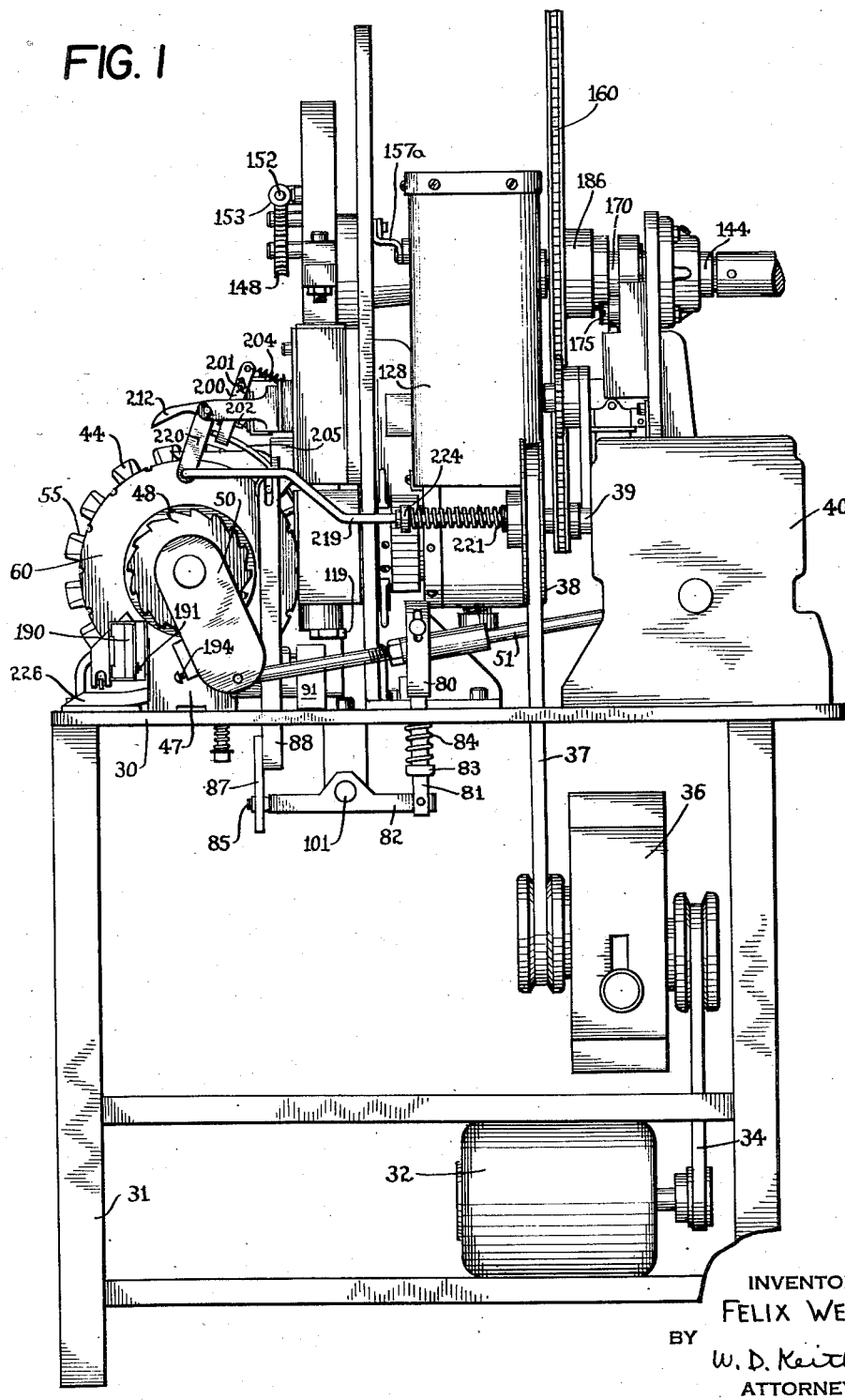
Fig. 1 is a side elevation of one example of a machine for filling and sealing the ends of tubular capacitors.

Referring to Fig. 1 the major part of the machine may be mounted on a table or bed 30 carried upon a suitable framework 31 which also supports a driving motor 32. The motor 32, through a belt 34 transmits power to a variable speed device 36, which may be of any suitable, known type and is therefore not shown in detail, and the output of the variable speed device drives a belt 37 which in turn drives a pulley 38 on a main shaft 39 extending to a speed reducing gear unit generally designated 40. This unit may likewise be of any suitable, known type, having an output shaft 42, shown in Fig. 2 and in dotted lines in Fig. 3, for actuating further means as hereinbelow described. The speed reducer 40 may provide, for example, a 20 to 1 reduction.

Figure 2:
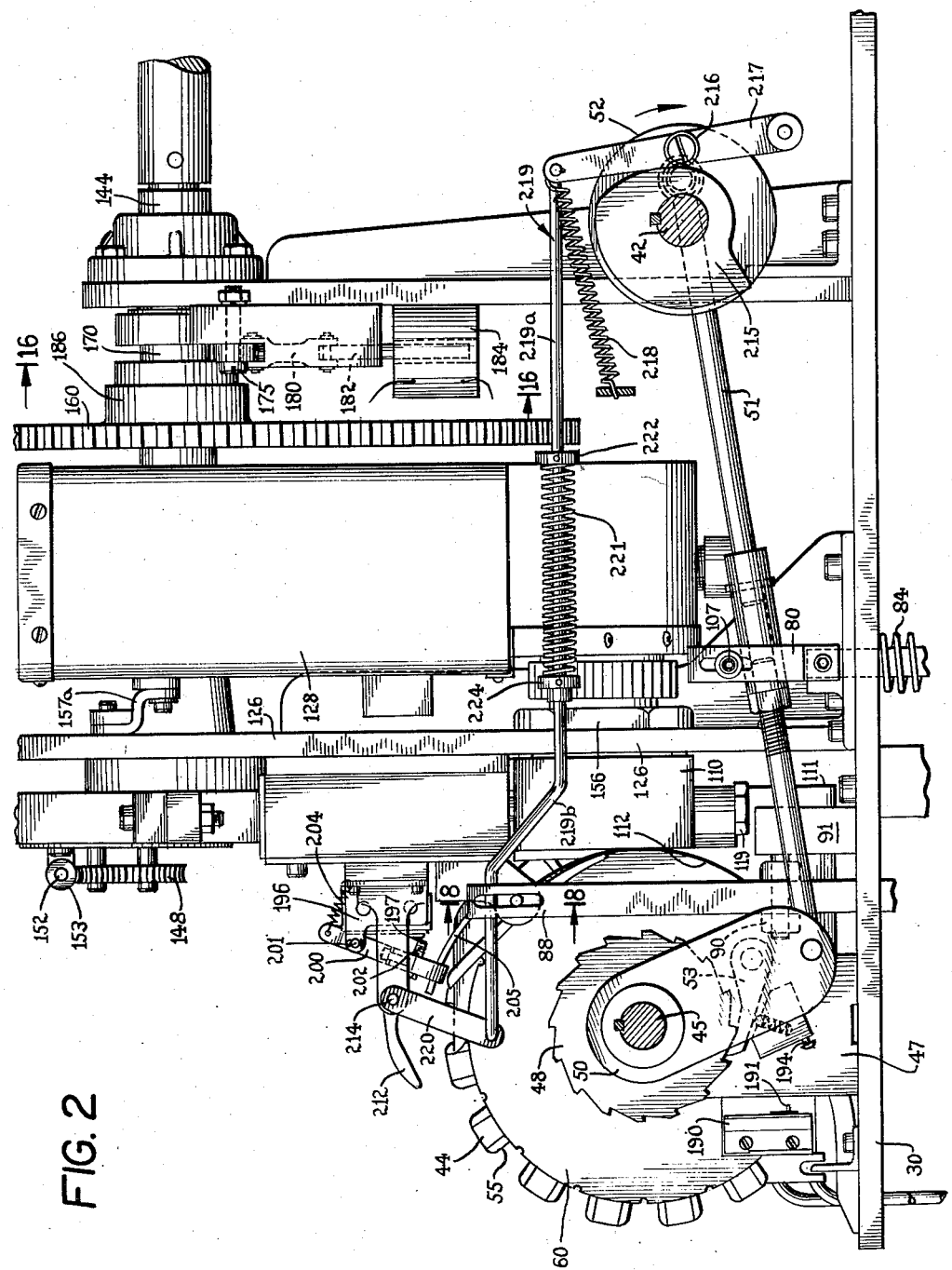
Fig. 2 is a view, enlarged relative to Fig. 1, and taken chiefly in elevation, but on a plane somewhat behind that of Fig. 1, to illustrate the upper and principal parts of the machine.
Figure 3:
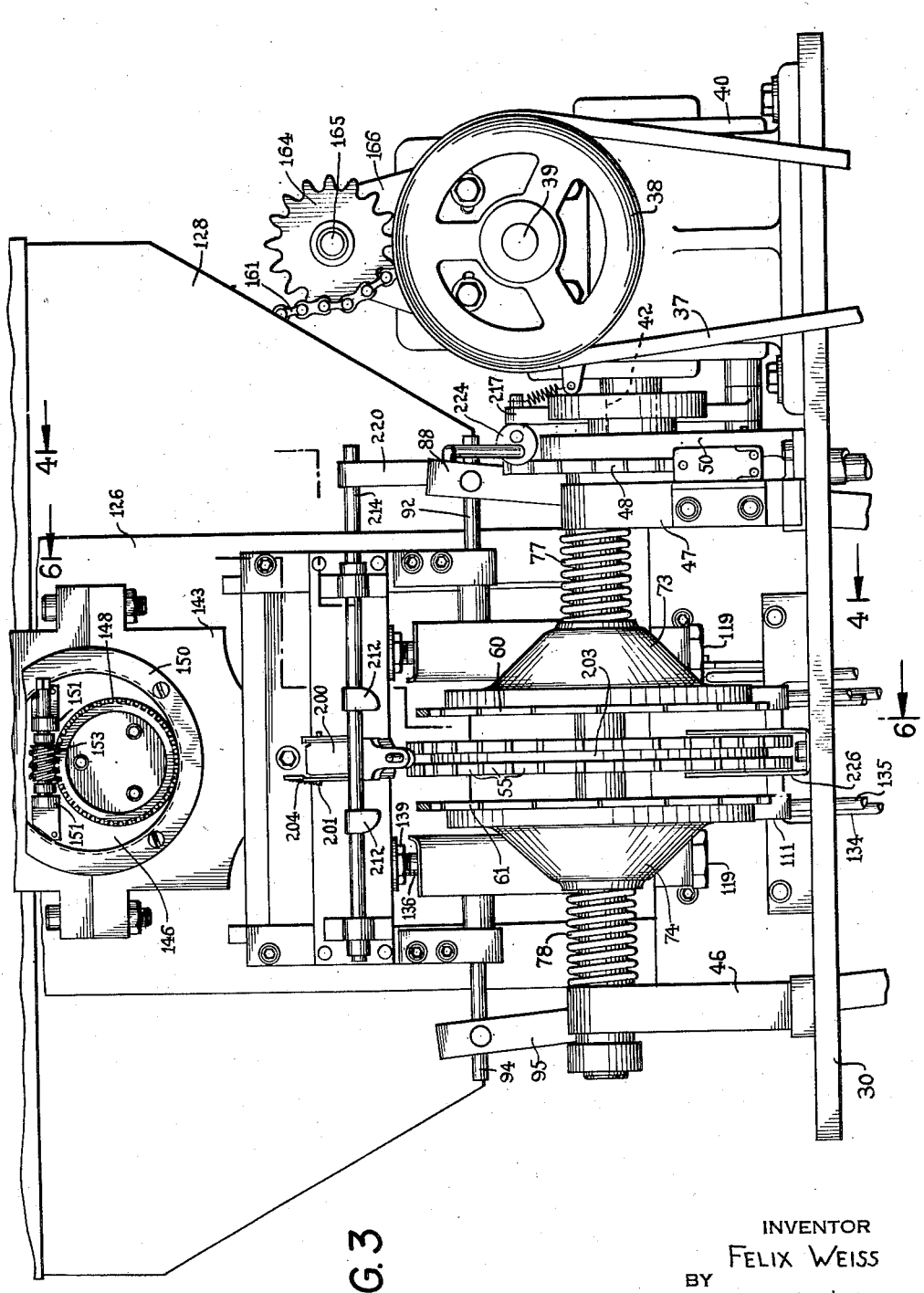
Fig. 3 is an end elevation corresponding to Fig. 2.
Figure 4:
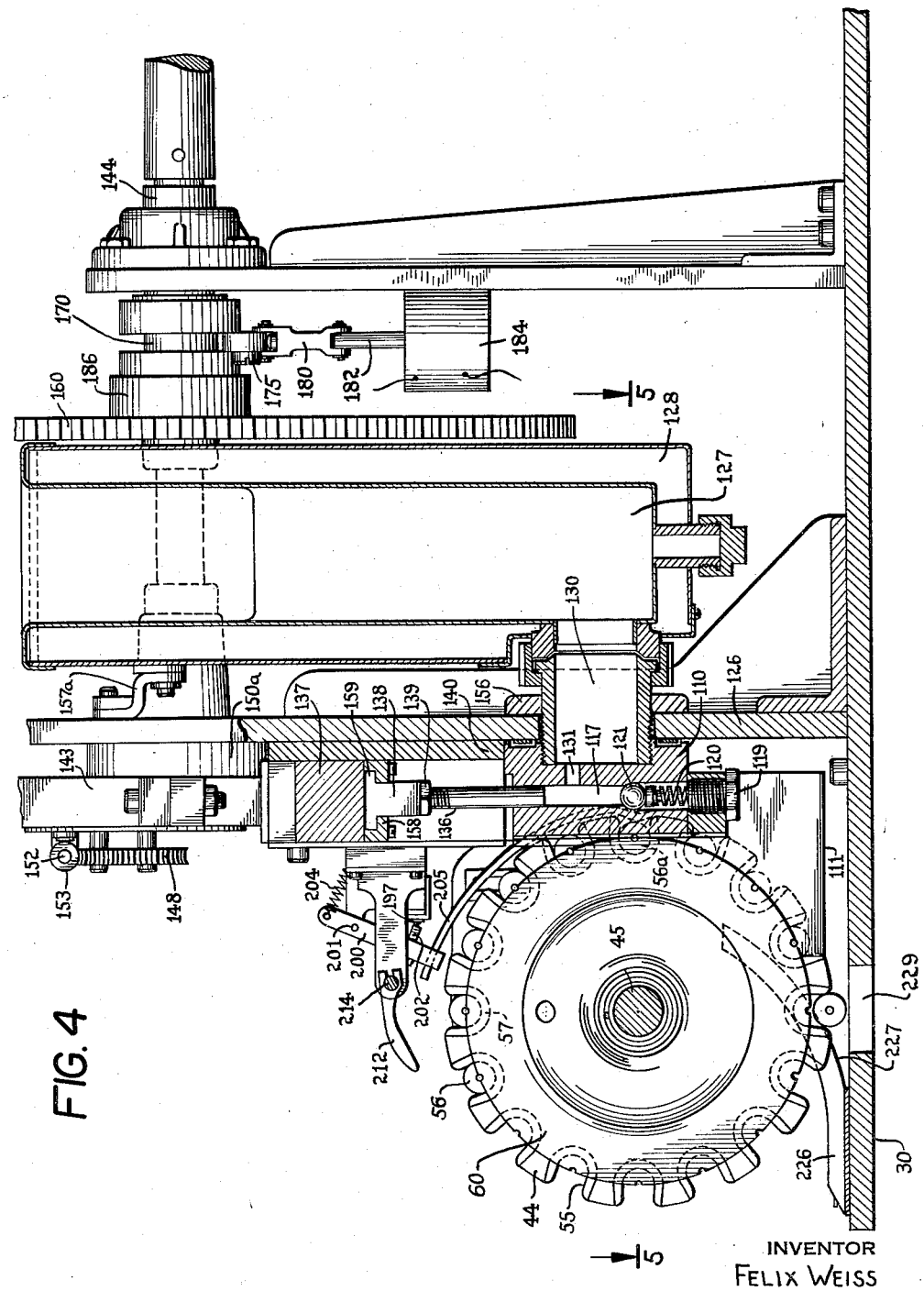
Fig. 4 is a section on line 4—4 of Fig. 3.

Referring also to Figs. 2 to 5, there is provided an indexing or conveyor wheel 44 carried on a horizontal shaft 45, which is journaled in appropriate supports 46, 47 and carries, outside the support 47, a ratchet wheel 48. A ratchet arm 50 is rotatably supported on the outer end of the shaft 45, and the opposite end of the arm is linked by a connecting rod 51 to an eccentric 52 carried on the shaft 42 (Fig. 2). The arm 50 carries a spring-pressed ratchet 53 cooperating with the ratchet wheel 48 so that reciprocation of the rod 51 by the eccentric 52 serves to turn the shaft 45 and the indexing wheel 44 intermittently clockwise as seen in Figs. 1, 2 and 4.

The periphery of the indexing wheel is provided with regularly spaced grooves or notches 55 to receive and hold the tubular condenser assemblies as shown at 56, each recess holding a single capacitor in a horizontal position, i. e. with its axis parallel to that of the shaft 45. If desired, the notches 55 may actually be constituted by correspondingly notched inserts 57 removably seated in larger recesses or grooves in the wheel itself, whereby such inserts may be removed and replaced with others of different sizes to accommodate capacitors of correspondingly different diameters. The ratchet wheel 48 has its teeth or serrations corresponding in number and location with the grooves of the indexing wheel 44, so that successive advances of the latter by the ratchet will position successive capacitors in proper relation to the instrumentalities hereinbelow described.

Where the apparatus is used to fill the ends of tubular condensers which have lead wires or so-called pigtails projecting from such ends, means are provided to hold and support the wires when the capacitor is carried by the wheel 44. Such means may comprise a pair of guide discs 60, 61 carried by the shaft 45 on opposite sides of the indexing wheel. Each disc has a plurality of small notches 62 spaced about its periphery, the disposition of the notches being such as to cooperate with the inserted condensers, to hold their lead wires. Thus as shown also in Figs. 5 and 8, the wires 63, 64 projecting from the ends of the condenser 56 are fitted into the notches of the guide discs, it being noted that the capacitor structure includes a condenser element 65 disposed inside the tube and comprising, as explained above, a rolled arrangement of foil and insulating paper, for which the wires constitute terminals by virtue of their flattened spiral portions or the like 67, 68, soldered to the exposed foil at the ends of the condenser element 65. The guide discs may conveniently serve a further function, viz. to hold the condenser 56 against lateral displacement, the discs being disposed so that the tube fits with some snugness between them.

Figure 5:
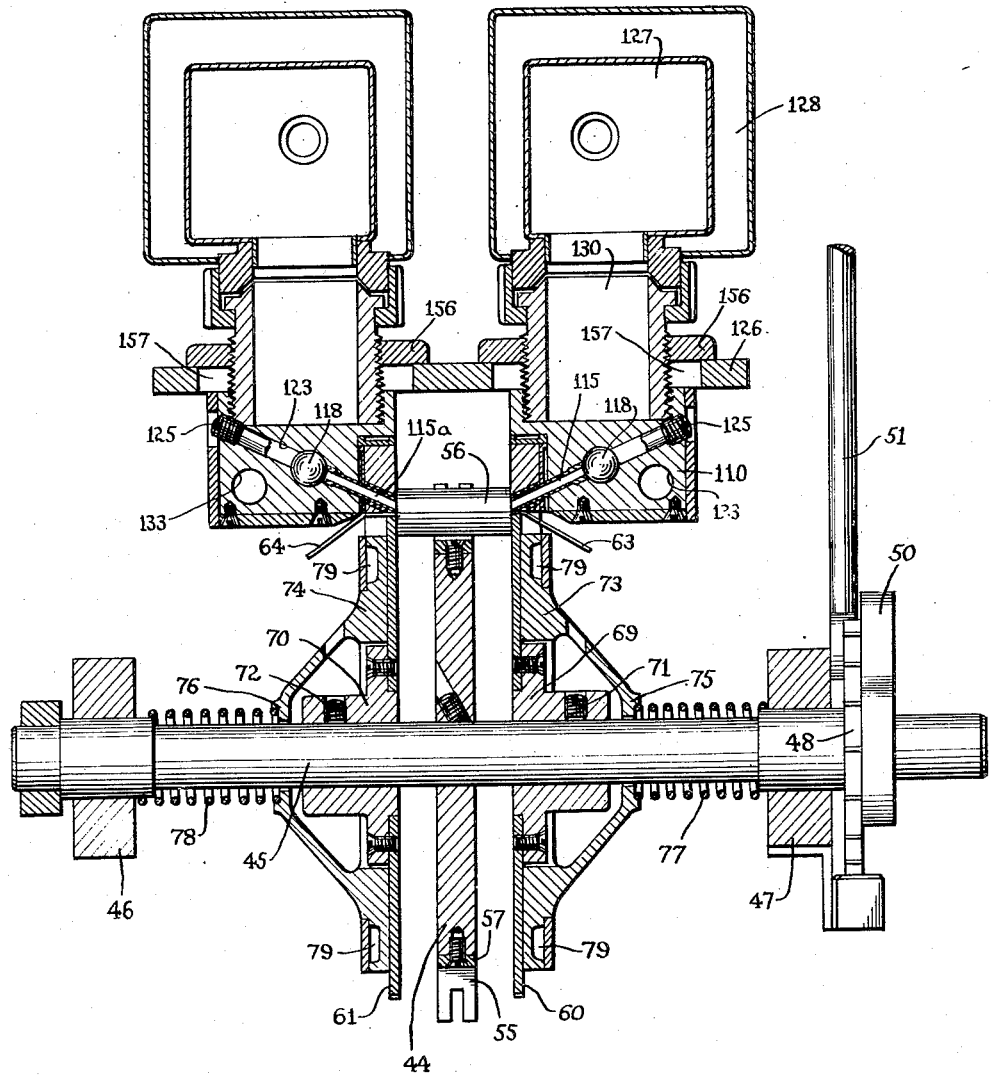
Fig. 5 is a horizontal section, on line 5—5 of Fig. 4.

The supporting structure for the discs is shown in Fig. 5 and includes corresponding hubs 69, 70 to which the respective discs 60, 61 are secured and which are fastened to the shaft 45 by set screws 71, 72 (Fig. 3). Thus the location of the discs on the shaft may be adjusted as desired, to fit capacitors of various lengths. The outer portions of the discs are engaged respectively by annular members or cooling plates 73, 74 which have central annular flanges 75, 76 disposed outside the hubs 69, 70 and loosely surrounding the shaft 45. A pair of coiled springs 77, 78 are arranged, under compression, between the outer surfaces of the ring flanges 75, 76 and the adjacent bearing supports 47, 46, whereby the annular members 73, 74 are continuously urged toward each other and thus in good contact and heat transfer relation to the discs 60, 61. If desired, a suitable liquid coolant may be circulated through annular passages 79 in the cooling members or plates 73, 74, to which appropriate supply and discharge connections (not shown) may be made. The springs 77, 78, acting through the cooling plates, also facilitates the setting up of the machine for different lengths of capacitors, i. e. when the set screws 71, 72 are loosened and the positions of the discs 60, 61 are to be adjusted. The cooling members or plates are adapted to remain stationary but with their faces in sliding engagement with the adjacent sides of the discs 60, 61. It will be understood that the discs are turned by the shaft 45, along with the indexing wheel, and thus cooperate with the latter in providing conveyor structure for the successive capacitors.

Whereas the foregoing means may serve to locate the capacitor tubes properly in the indexing wheel, it is important to insure disposition of each condenser section 65 centrally, or at least approximately at the center, of each tube, in order to provide space for the desired charge of sealing compound and thus to insure a seal of adequate thickness and effectiveness at both ends of the tube. For such purpose positioning means may be provided, which are actuated and arranged as described below.

The connecting rod 51 slides through a U-shaped saddle 80 (Figs. 1, 2, 3, and 7) from which a downwardly projecting rod 81 is pivoted to one end of a rocker arm 82. The rod 81 carries a collar 83, and a coil spring 84 is disposed under compression between the collar and the underside of the table 30, the rocker arm 82 being mounted beneath the latter. The opposite end of the rocker arm 82 carries a cam pin or member 85, conveniently of a curved shape, which rides in an inclined cam slot 86 provided in a plate 87 that is mounted at the lower end of a vertical lever or rod 88. The rod 88 is pivotally supported, at an intermediate locality 90, to a pivot bearing support 91 which is fixedly secured to the frame of the machine, and the upper, opposite end of the rod 88 is pivoted to a transverse rod 92 so that as the rod 88 rocks about its central pivot 90, the rod 92 can be displaced back and forth along its own axis.

At the other side of the machine a similar rod 94 is disposed for horizontal reciprocation along its axis in alignment with the rod 92, by rocking displacement of the pivotally connected lever or rod 95, which rocks about a fixed pivot 96. The lower end of the rod 95 carries a plate 97, provided with an inclined cam slot 98 for a cam member 99 at the end of another rocker arm 100 which is mounted on a shaft 101 to which the rocker arm 82 is also secured; in fact, all of the parts just described, including the rod 94 and the several means actuated by the shaft 101, are conveniently identical with the corresponding parts first described as operated by the rocker 82.

Thus as the connecting rod 51 moves up and down by virtue of its eccentric drive and pivotal connection to the ratchet arm 50, the spring 84 holds the top of the saddle 80 against the top of the rod and the combined effect of these instrumentalities is to rock the arm 82 and its shaft 101. As the cam member 85 is thus vertically reciprocated, its engagement by the inclined cam slot 86 moves the member 87 in a generally horizontal direction, rocking the rod 88 about its central pivot and correspondingly reciprocating the rod 92 in the manner described. The rocker arm 100 mounted on the shaft 101 is correspondingly rocked with the arm 82 and the described like connections effect the same horizontal reciprocation of the rod 94, i. e. the same movement as that of the rod 92, but in an opposite sense.

As shown in Figs. 8 and 9 the rods 92, 94 are respectively arranged to slide through guide sleeve structures generally designated 102, 104, to keep the rods in accurate coaxial alignment with each other, and specifically also to align them with the ends of a tubular condenser held by the indexing wheel and cooperating discs when the conveyor structure is in an intermittent condition of rest. Each of the rods 92, 94 inwardly terminates in a rod section 105, which may conveniently be of smaller diameter than the supporting rod portions 92, 94. It will be seen that the rods 105 are thus disposed to enter the ends of the condenser tube 56 and engage the ends of a condenser element or section 65 disposed therein. As the rods 92, 94 are simultaneously rocked toward each other, they thus position the condenser section 65 at the desired central location, i. e. in that if the section 65 is laterally offside, one or the other of the rods or pins 105 will push it to the center position.

Figure 7:
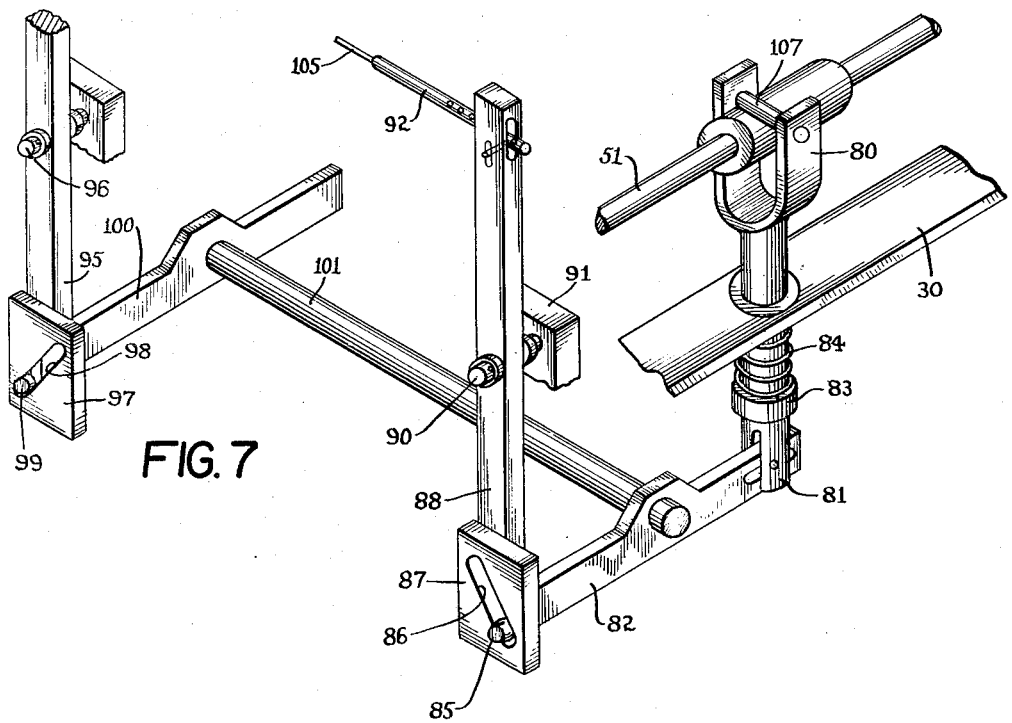
Fig. 7 is a somewhat diagrammatic, isometric view of the mechanism for actuating the positioning rods.

If desired, the pins 105 may be adjustably mounted, for instance by having a number of selectable pivot holes for their supporting rod portions 92, 94, to fit various lengths of condenser sections 65, i. e. so that when the rods are at their innermost positions they will just engage the ends of a condenser section of predetermined size. Although the rod portions 92, 94 may also, if desired, be spring-mounted relative to the levers 88, 95 so as to yield slightly should the latter move appreciably inward after one or the other of the pins 105 has brought the condenser element to the center position (where both pins engage it), the simple pivot connection shown in Figs. 7, 8 and 9 is ordinarily satisfactory. Indeed the drive of the rods or pins 105 by the spring 84 (as explained hereinbelow) allows for small differences in length of the capacitor section 65, and this yieldable character of the drive is ordinarily sufficient to prevent jamming of the rods 105. It will be noted that the disposition of the rods is such as to clear the lead wires 63, 64 of the condenser section, for instance by having the axis of the rods slightly displaced from the axis of the condenser tube 56 and its center section 65.

In operation, it may be assumed that the eccentric or crank 52 travels in a clockwise direction as seen in Fig. 2. Thus during the latter part of the time that the ratchet 53 is being withdrawn from its last position of engagement with a tooth of the ratchet wheel 48, toward a position to engage another tooth, the connecting rod 51 is raised at its center, and the saddle 80 is accordingly pulled up, against the pressure of the spring 84. As the saddle 80 rises, the arms 82 and 100 are rocked counterclockwise and by virtue of the cam slot arrangement the rods 88, 95 are rocked inwardly at the bottom, and outwardly at the top. As the ratchet 53 then engages the next tooth of the wheel 48 and as the further rotation of the eccentric 52 and corresponding axial displacement of the rod 51 then cooperate to move the indexing wheel one step, the positioning rods 92, 94 are effectively at rest in their outermost positions.

Finally when the eccentric 52 turns further, providing essentially downward motion of the outer end of the rod 51, preparatory to initiation of a further cycle, the fall of the rod permits the tension of the spring 84 to carry down the saddle 80 and the corresponding end of the rocker arm 82. The arms 82 and 100 then rock in the reverse direction, and likewise the vertical rods or levers 88 and 95 so that the positioning rods 92 and 94 move inwardly, toward each other. Fig. 8 illustrates disposition of these rods in their first-described conditions of rest, i. e. just after the indexing wheel 44 has moved a capacitor to a position between their end extensions 105. Then by the described further operation of the rod actuating parts, the rods 105 are brought together, into engagement with the condenser section 65 and positioning it, by such displacement as may be necessary, at the center of the surrounding tube—all as shown in Fig. 9.

It will be noted that the location of the guide rods relative to the indexing wheel is at a station preliminary to the filling means hereinbelow described. It will also be noted that the pivots for the rods 92, 94 in the ends of the levers 88, 95 permit the rods to swing slightly in suitable vertical slots in the upright levers, to accommodate the rocking motion of the latter to the strictly linear displacement of the rods 92, 94. If desired, the cross-piece 107 of the saddle 80 may be mounted for vertical adjustment in the latter, to afford a desired, precise adjustment of the timing of the operation of the positioning rods relative to the reciprocating, intermittent drive.

After the positioning station the successive capacitors are advanced by the indexing wheel 44 to a filling station where the molten wax or other plastic material is introduced under pressure into the open, hollow ends of the articles. The instrumentalities for so advancing the wax include certain structures duplicated at opposite sides of the indexing wheel and guide disc assembly, and for convenience of exposition, description will be set forth of the parts at one side, it being further understood that corresponding structure, similarly identified in various views of the drawings, is found at the other side.

Referring specifically to Figs. 2, 4, 5, 6 and 10 to 12 there is provided a filler block 110 carrying a face and guide plate 111 which is of substantial thickness and has a curved edge 112 conforming with the periphery of the guide disc 60 so that as the latter is turned its edge slides around the edge 112, with the lead wires 63 kept out of the way, in the notches of the disc. The face 113 of the plate 111 is thus adapted to abut those portions of the ends of the tubular capacitors that are exposed outside the edge of the guide disc 60, constituting in effect a closure for such ends during travel of the indexing wheel for several successive steps to and beyond the filling station.

Figure 12:
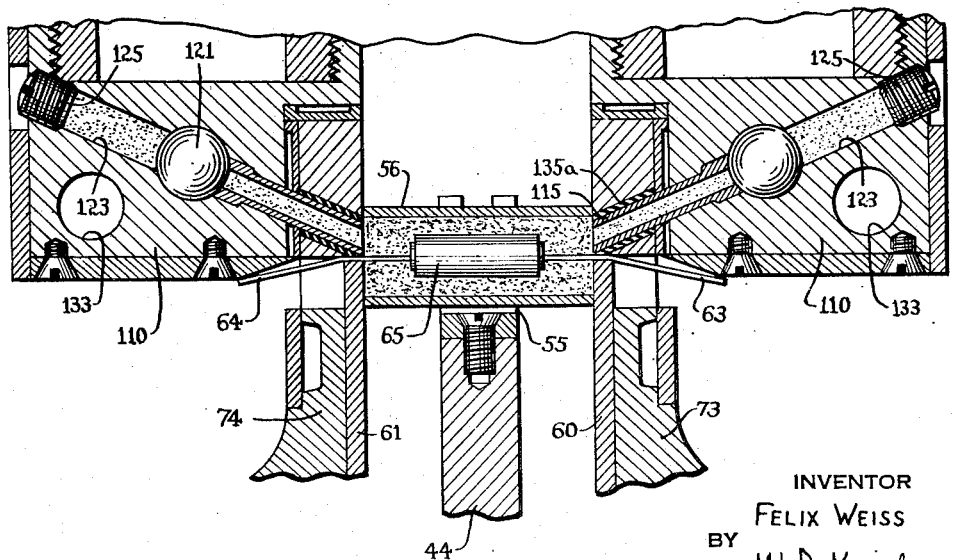
Fig. 12 is a horizontal section corresponding generally to Figs. 5 and 10, showing the manner in which the sealing material is directed into the ends of the condenser tube.

The filler block and guide plate are traversed by a horizontal conduit 115 which opens at the face 113 of the guide plate in a position adjacent the hollow end of the capacitor when the latter is brought to rest in the filling position by the indexing wheel. The conduit is conveniently disposed at an acute angle to the face of the block (and the plane of the indexing wheel), and as shown in Figs. 10 and 12, extends to a central region in the block where it opens into a cavity 116. The cavity 116 communicates with a vertical cylindrical passage 117 and has a lower extension 118 closed by a plug 119, the latter seating one end of a compressed coil spring 120 which holds a ball valve member 121 against the opening of the cylinder 117, such opening thus constituting a seat for the valve member so that the outlet passage 115 is closed from communication with the cylinder except upon occurrence of sufficient pressure in the latter to force the valve member away from its seat.

A further horizontal passage 123, aligned with the passage 115, extends to the opposite side of the filler block where it is closed by a plug 125, the latter being removable for cleaning out the passage 115 at desired times, i. e. providing the plug 119 is also removed to allow the ball valve assembly to be taken out. The angular relation of the passage 115 to the guide plate 111 and the indexing wheel 44 permits direct access to the end of the tubular condenser for introduction of wax, while keeping the condenser itself in a position desirably spaced, to as great an extent as possible, from heated regions such as the passages and chambers for the molten wax.

The filler block 110 is carried on an upright supporting wall 126, which at its rear side carries a supply chamber 127 for wax or other material, having a surrounding jacket 128 through which a heating medium, e. g. hot water, steam or other heated fluid may be circulated to keep the supply of wax in an appropriately molten or other flowable condition. Alternatively, the space represented by 128 may be occupied by an electrical heating element outwardly protected by thermal as well as electrical insulation. A large outlet conduit 130 extends from the lower part of the chamber 127 into the block 110 but is closed by the later except for a passage of reduced diameter 131 opening into the cylinder 117 at a region above the ball valve 121. Appropriate heating means may be incorporated in the filler block, e. g. such as an electrical heating unit of cylindrical form vertically disposed therein as indicated diagrammatically at 133. Thus the wax advanced to or resting in the filler block may be maintained in a liquid condition. At the same time appropriate cooling fluid or the like may be circulated in passages such as shown at 134, 135 in the guide plate 111, to promote cooling of the wax in the condenser after it has been discharged by the passage 115. The discharge end of the conduit 115 is flush with the exposed face 113 of the plate 111, and the conduit is preferably surrounded by a sleeve of mica or other thermal insulation 135a where it passes through the guide plate 111.

It will be appreciated that the molten wax may have a relatively high temperature, and the guide plate face 113 thus has a pronounced chilling effect so that after relatively few steps of further advance by the indexing wheel, the sealed condenser ends are fully solidified and hardened against deformation or impairment of the desired seal. Although the material in the supply chamber 127 may be very viscous or may be melted only to the point where it has a sluggish fluidity, and although the connection of an air hose or other supply (not shown) of gas under pressure to the top of the supply chamber may be required to facilitate downward feed of the material, a highly fluid or fully melted wax may be satisfactorily fed by gravity through the passages 130 and 131 into the cylinder 117, with the cooperation of the pumping means presently to be described.

Figure 6:
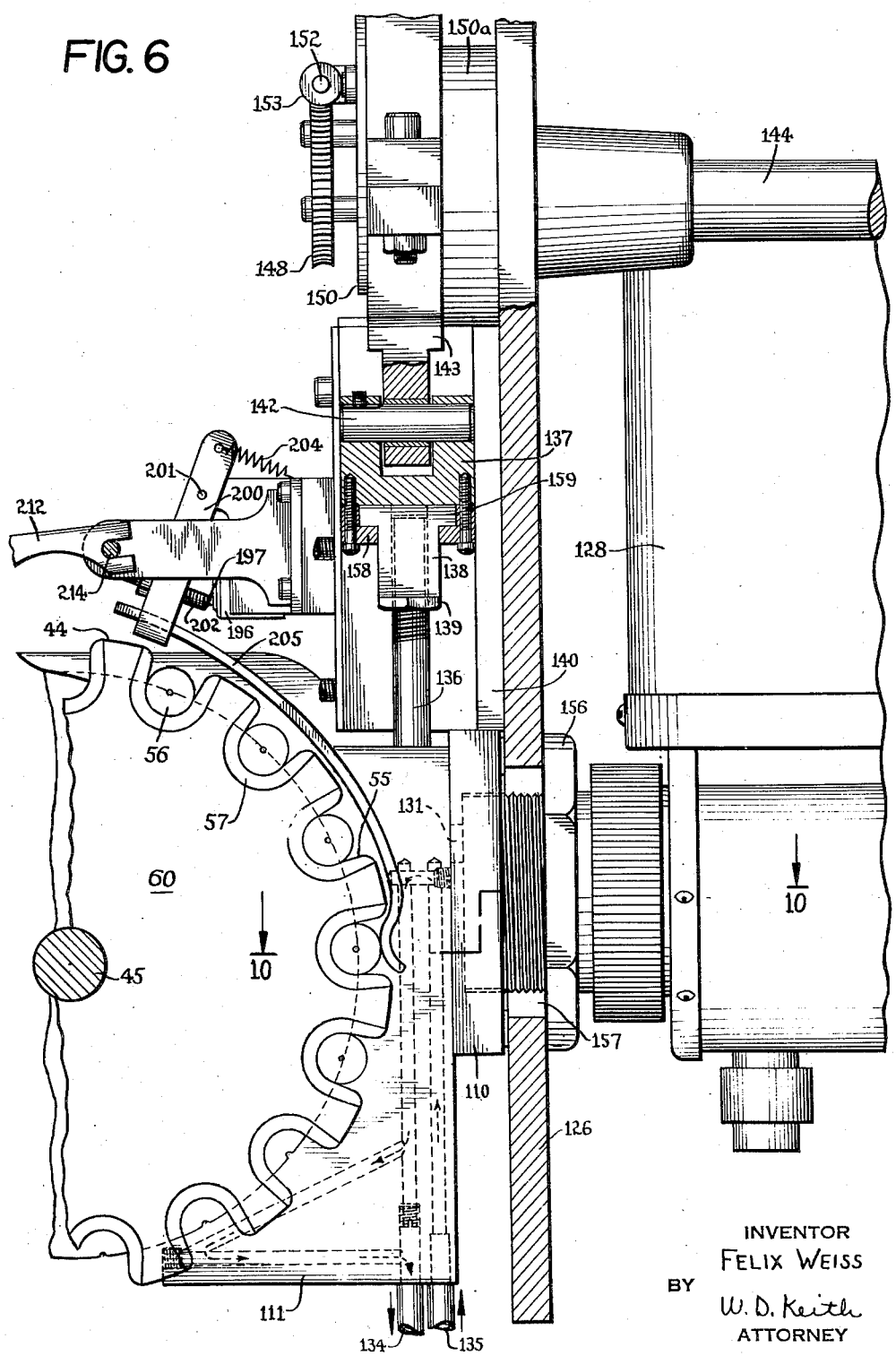
Fig. 6 is a further enlarged, fragmentary, vertical section, with certain parts in elevation, on line 6—6 of Fig. 3.

Referring further to Figs. 4 and 6, the cylinder 117 has a piston or plunger 136 sliding therein in a vertical direction, the piston being mounted to depend from a cross-head 137 by means of a threaded sleeve 138 and lock nut 139 which engage a correspondingly threaded portion of the cylindrical plunger. As intimated hereinabove, the crosshead 137 carries, at a position on the other side of the indexing wheel, an identical piston (not shown) cooperating with an identical filler block 110 (Figs. 5 and 12) which has a valve structure, passages and associated supply tank identical with the parts above described, but arranged so that the outlet passage or nozzle 115a directs wax into the opposite end of the tubular capacitor. The crosshead 137 is adapted for vertical reciprocation in suitable guides 140. By means of a pivot pin 142 the crosshead is pivotally connected to the lower portion of a crank member 143 which is driven by a shaft 144 so as thereby to reciprocate the crosshead and pistons in a vertical direction.

Figure 15:
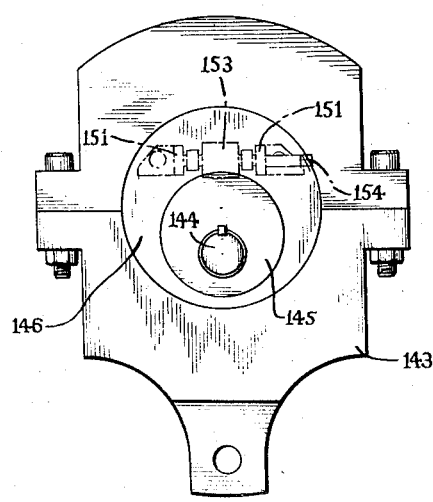
Fig. 15 is a reduced section on line 15—15 of Fig. 14.
Figure 14:
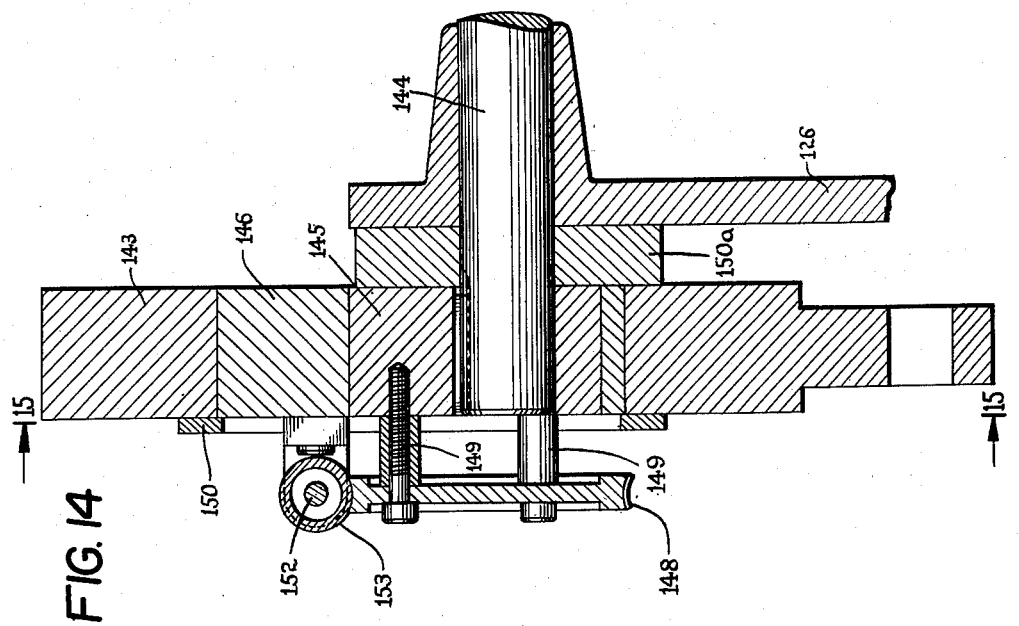
Fig. 14 is a section on line 14—14 of Fig. 13.
Figure 13:
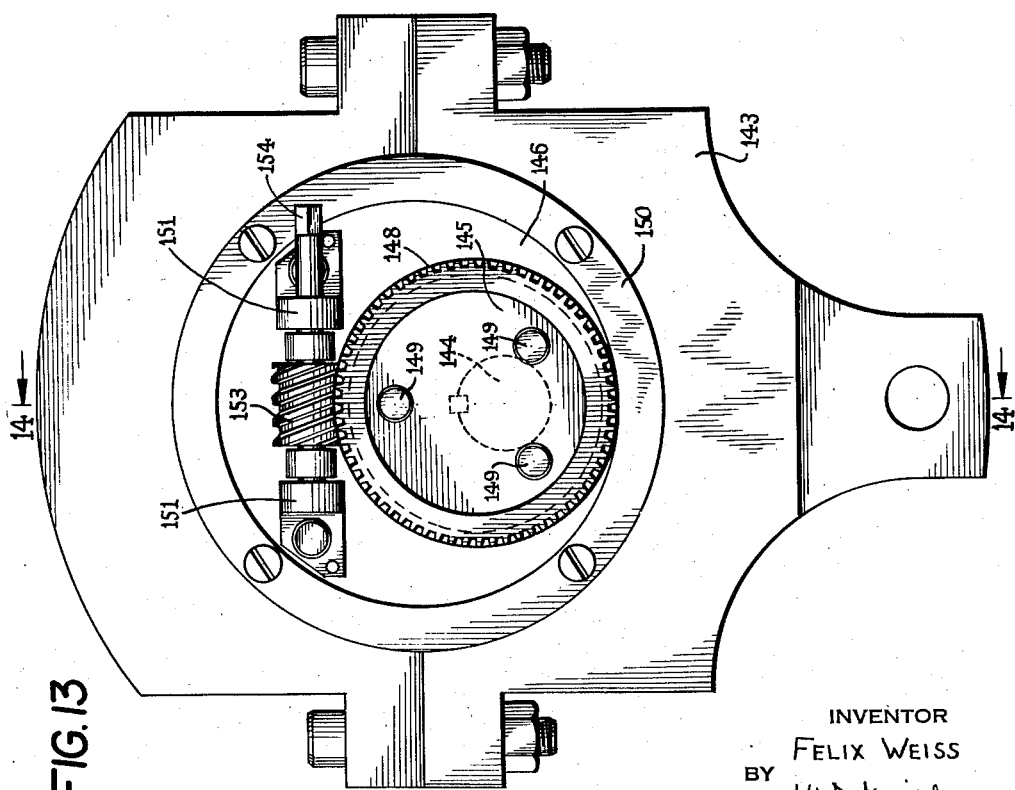
Fig. 13 is an enlarged elevation of a crank member shown at the upper part of Fig. 3.

The connection between the crank member and the shaft 144 is conveniently of an adjustable nature, to permit an exact adjustment of the length of stroke of the pistons, and thus of the amount of wax or the like discharged into the condenser ends on each stroke. For example, referring to Figs. 3 and 4 and especially to Figs. 13, 14 and 15, the shaft 144 carries an eccentric collar 145, around which there is disposed another eccentric collar 146, the latter in turn being located within a rotatably fitting cylindrical opening in the crank member 143. The collar 145 carries, conveniently in a plane spaced from its outer surface, a worm gear 148, the worm gear being secured to the collar 145 by bolt and spacer assemblies 149 so that the gear and collar are a rigid unit, rotating only together. A ring member 150 is mounted on the face of the crank part 143 around its circular opening and overlaps the collar member 146 so as to retain the latter in place, i. e. in cooperation with a backing washer or collar 150a. The collar 146 has mounted upon it a pair of bearing supports 151 for the shaft 152 of a worm 153 engaging the worm gear 148. A projecting end 154 of the shaft 152 is squared or otherwise appropriately shaped so that the shaft may be readily turned at desired times.

Bearing in mind that the intermediate collar 146 is adapted to rotate around the collar 145 and within the crank member 143, i. e. is adapted for rotative displacement relative to these parts, and also noting that the inner collar 145 has a predetermined eccentricity of its outer surface relative to the shaft 144, it will now be seen that the actual eccentricity of the crank member relative to the shaft depends on the setting of the worm 153. Despite their otherwise freely rotative engagement the collars 145 and 146 are in fact held against mutual rotation by the engagement of the worm and the worm gear, so that their assembly constitutes an eccentric bearing which turns within the crank arm and thus effectively reciprocates the latter. At the same time, by turning the worm shaft 152, e. g. by its end 154, the relative angular positions of the collars 145 and 146 may be adjusted, for instance to effect relative displacement of the shaft 144 from its position of maximum eccentricity as shown, through a range of positions to a location of minimum eccentricity.

By means described below, the shaft 144 is turned through one complete revolution during each period of rest of the indexing wheel 44, and thus the pumping means constituted by the plunger 136 and cylinder 117, together with associated supply and delivery instrumentalities, will be operated to deliver a charge of wax into the end of the condenser that happens to be positioned at the filling station. More specifically, assuming that the pistons (for both of the filler blocks 110) are at their uppermost position, that the cylinders 117 are appropriately filled with molten wax from the supply tanks 127, and that the ball valves are closed to prevent egress of wax through the discharge nozzles, the shaft 144 is set in rotation, to rock the crank 143 and move the crosshead 137 downwardly. The pistons 136 thus descend, exerting force on the charges of wax in the cylinders, and the pressure is sufficient to open the ball valves 121 and force the wax out through the nozzles 115, 115a (see Figs. 5 and 12). As a result molten wax is delivered under pressure directly and simultaneously into both open ends of the condenser tube 56, conveniently in just sufficient amounts to fill the latter to a plane flush with the adjoining faces 113 of the guide plates and the cooperating and similarly adjoining faces of the guide discs 60, 61. Where, as shown in Figs. 8, 9 and 12, the inner condenser element 65 has a smaller diameter than the inside diameter of the tube 56, the described operation also forces the wax in around all sides of the element, to provide a complete and highly effective seal.

On completion of its downward stroke, the crank 143 then retracts the crosshead 137 upwardly, pulling up the pistons 136 and relieving pressure on the valves 121. During the upward stroke, the resulting suction, in cooperation with the gravity or other pressure exerted by or through the supply in the wax cylinders, refills the cylinder 117 in preparation for a succeeding operation. At the end of one revolution the shaft 144, however, comes to rest, subject to being restarted at the proper time for another feeding operation, i. e. into the next capacitor.

As the pistons 136 travel downward, each first passes, and thus closes, the opening 131 which communicates with the supply tank. Thereafter the pressure exerted by the pistons is sufficient to open the ball valves 121, so that the molten filling material is effectively ejected into each end of the condenser tube through the conduits 115 and 115a. Each piston then initiates its return or upward travel, allowing the ball valve 121 to close and thereafter creating a vacuum in the lower portion of the cavity 117 above the ball valve. As the piston continues to rise and opens the passages 131 to the cavity 117, a further quantity of filling material is sucked into the latter from the supply tank, ready for the next cycle of operation.

As explained above, a fine and exact adjustment of the length of pumping stroke and thus of the amount of material discharged, is achieved by the means for changing the crank eccentricity, e. g. by suitable means such as the illustrated worm and gear mechanism. If desired, a preliminary coarse adjustment, and likewise an adjustment of one piston relative to the other, may be effected by screwing the upper end of the piston in or out relative to the bushing 138 and then locking each assembly in place with the nut 139. Preferably, too, each pump and supply instrumentality on both sides of the indexing wheel is mounted in a releasably secured relation to the upright support 126 so as to permit these parts to be displaced horizontally, i. e. toward and away from each other. For instance, as shown in Fig. 5, the filler blocks 110 and associated parts may be supported by being threaded on the large conduits 130, the latter being clamped to the wall 126 by nuts 156; and the openings 157 in the wall through which the conduits 130 pass may comprise horizontal slots, so that upon loosening the nuts 156 the tanks 128 and filler blocks may be moved sidewise as desired and then re-clamped in their selected new positions. If as shown in Fig. 2 the upper ends of the tanks are braced by arms 157a each bolted to the wall 126 and to the coresponding tank, each arm may likewise have a horizontal slot (not shown) for the attaching bolt at one end or the other, to permit the described adjustment of the tank and filler block assemblies toward or away from each other. It will be understood, of course, that alternative arrangements may be provided, if desired, to effectuate such adjustability of the filler blocks and tanks.

The mounting of the bushings 138 on the crosshead 137 may be similarly adjustable, as by virtue of the undercut or flanged retaining bars 158 which extend along the crosshead and which are releasably clamped on projecting flanges 159 of each bushing; upon releasing the bars, the bushings can be moved toward or away from each other, and can be re-secured in their new location. In such fashion, the pumping and delivering instrumentalities may be adjusted in position to accommodate condensers of different length, all in cooperation with the other features of adjustability for like purpose as explained elsewhere herein.

The drive the shaft 144 at desired times a large sprocket wheel 160 is supported for free rotation thereon and carries a chain 161 (see Figs. 1, 2 and 3) which passes around a driving sprocket 162 on the drive shaft 39, the chain being tensioned by a tensioning sprocket wheel 164 idling on a stub shaft 165 carried by an arm 166 which is angularly adjustable to maintain proper tension of the chain 161. For driving connection between the sprocket wheel 160 and the shaft 144 at desired periods suitable clutch means are provided, timed with the operation of the condenser advancing mechanism.

Figure 16:
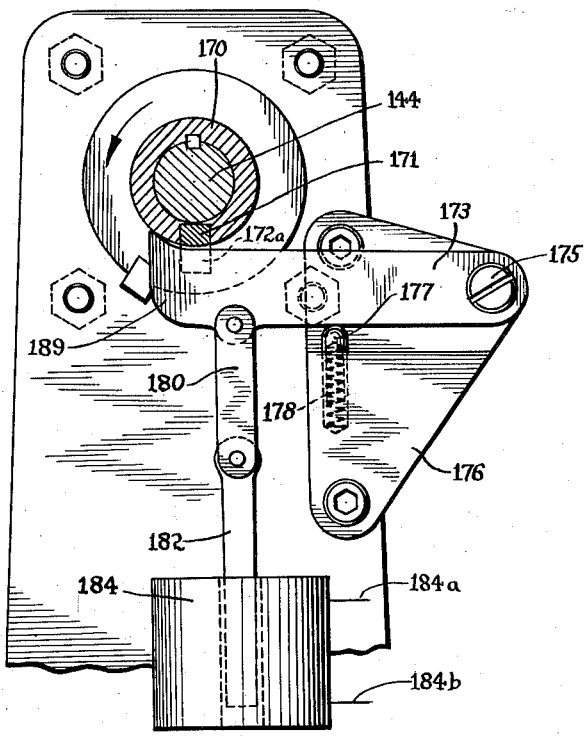
Fig. 16 is a fragmentary section on line 16—16 of Fig. 2.
Figure 17:
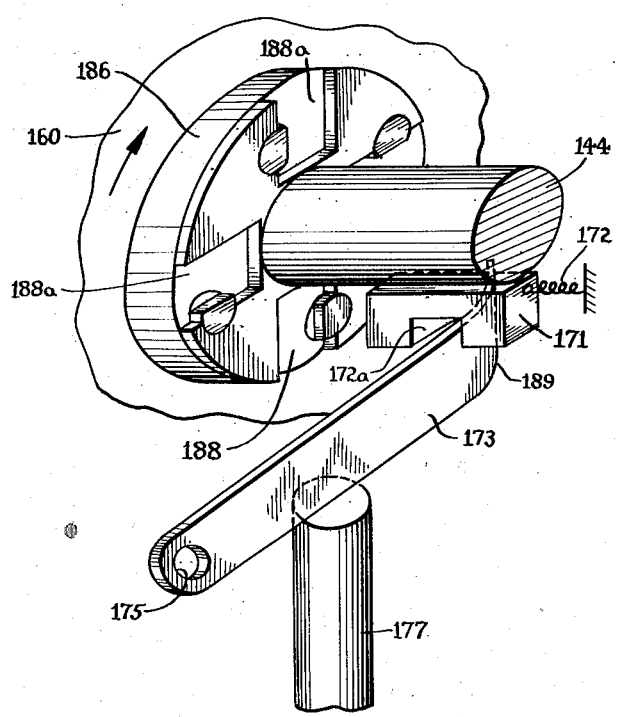
Fig. 17 is a diagrammatic, exploded, isometric view showing other parts of the clutch device illustrated in Fig. 16.

For instance, an electromagnetically controlled one-revolution clutch is illustrated in the drawings, for example, in Figs. 1, 2, and 4, and especially in Figs. 16 and 17. The shaft 144 has keyed thereto a collar 170 which has a notch or recess receiving a dog 171 that is adapted to slide axially of the shaft and that is normally held in a retracted position (against a spring 172), as shown in Fig. 16, by the concavely curved end of an arm 173 fitting into a notch 172a at the underside of the dog. The opposite end of the arm 173 is pivoted to a fixed point of the frame at 175, e. g. by a suitable pin extending into a mounting plate 176, and a plunger 177 urged upwardly by a spring 178 normally retains the arm in the illustrated position of Fig. 16 so as to keep the dog 171 retracted—the shaft 144 being normally stationary.

An outer portion of the arm 173 is pivotally connected by a link 180 to the movable core 182 (which may be called an armature) of a solenoid 184 having electrical terminals 184a, 184b, this electromagnetic arrangement being such that upon energization of the solenoid 184 its core or armature 182 and the arm 173 are pulled downwardly against the spring 178. The dog 171 is thereby released, i. e. so that it may move outwardly parallel to the shaft 144, under the force of the spring 172. The outer end of the dog is thus adapted to abut the face of a hub 186 carried by the sprocket wheel. The face of the hub has a recess 188 shaped to receive the end of the dog 171, so that as the sprocket wheel 160 is turned, the dog eventually moves on into the recess 188, effecting a driving connection between the sprocket wheel and the collar 170 (the rear end of the dog remaining engaged in the notch of the collar 170), and thus through the shaft 144, with the crank-operating collar 145. If desired, for more prompt completion of such operative connection, the face of the hub 186 may be provided with a multiplicity of such recesses as shown at 188a, so that the dog falls into the first to reach it as the wheel turns.

The shaft then continues to rotate under the drive of the sprocket wheel 160 and even though the arm 173 may have been restored to its original upper position by practically immediate de-energization of the solenoid 184, the dog will have moved promptly away from the region of the arm and will remain in its displaced, driving location as the shaft turns around. Thus a complete revolution of the shaft 144 is effected and upon return of the dog to the vicinity of the arm 173, the curved or tapered end 189 of the latter, now again in its upper position, reengages one face of the notch 172a of the dog and cams the dog back into its recess in the collar 170. Since such displacement backs the dog out of the recess 188 in the hub 186, the shaft is disconnected from the sprocket wheel, and with the aid of the braking effect produced by the suction in the cylinders 117 together with such supplemental braking effect as the arm 173 may exert on the collar, the shaft 144 comes promptly to rest in position for a new cycle of operation at a desired later time.

For control of the solenoid 184 and thus of the mechanism for delivering wax under pressure to the ends of the capacitors, an electrical system is provided which is advantageously responsive both to the operation of the capacitor conveyor structure and to the actual presence of a capacitor in position for delivery of molten wax thereto.

Referring to Figs. 1 to 4, an electrical switch of suitable type, for example a so-called microswitch 190 having an operating button 191 which can be depressed to close a pair of normally open contacts 192 (Fig. 18), is disposed in the vicinity of the ratchet arm 50, specifically with the button 191 at the end of the path of travel of a stud 194 mounted on the forward surface of the ratchet arm. Thus each time the ratchet arm 50 completes its angular advance of the indexing wheel 44 by one step, thus bringing a new, unfilled capacitor into receiving position at the filling station, the stud 194 depresses the button 191 and closes the contacts 192 for a short period of time—which may be momentary but which will usually have an appreciable though brief duration because the eccentric 52 then has some further angular travel before it actually begins to retract the arm 50 to a significant extent.

Another suitable switch, for instance another micro-switch 196 having an operating button 197 depressible to close a pair of normally open contacts 198 (Fig. 18), is mounted above the indexing wheel 44 and has an associated operating arm 200 pivoted at 201 and carrying a stud 202 which is adapted to engage the button 197. The arm 200 is urged away from such engagement by a tensioned spring 204 connected to an opposite end of the arm, and there is also fixed to the arm, e. g. at a locality beyond the stud 202, a long sensing finger 205 adapted to overlie and engage the periphery of the indexing wheel 44. As shown in Fig. 4 and also in Fig. 6, the outer end of the sensing finger is adapted to be seated (under the tension of the spring 204), upon the outer tubular surface of a capacitor 56a occupying the desired position at the filling station, i. e. between the filler blocks 110.

That is to say, if there is no condenser beneath this end of the finger 205, its mounting arm 200 will remain in such position that the stud 202 does not actuate the button 197 of the microswitch 196, but if the indexing wheel has in fact advanced a condenser to the filling station, the end of the finger will rest on the outer surface of the condenser tube and will thus have moved the arm 200 sufficiently counterclockwise about its pivot (as seen in Figs. 2 and 4) for the stud 202 to depress the button 197 and close the contacts 198. It will be noted that the projecting peripheral portions of the indexing wheel 44 that lie between the successive recesses 55 have a slot 207 (Fig. 3), extending circumferentially of the wheel, into which the finger 205 may fall if there is no condenser beneath it.

Figure 18:
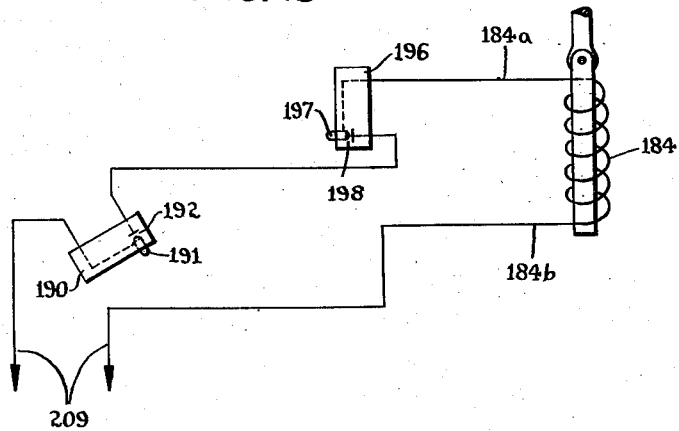
Fig. 18 is a wiring diagram of the electrical control for the clutch device.

Referring now to the wiring diagram of Fig. 18 it will be seen that the two switches 190, 196 are connected in series with the solenoid 184 across a suitable source of current 209, so that the solenoid is energized when and only when both sets of contacts 192 and 198 are closed. As will be apparent from the foregoing description, the presence of a condenser at the filling station, through the medium of the sensing finger 205, closes the contacts 198 throughout the time that the condenser is there located—the relative positions of the parts being preferably such, however, that even though a number of successive recesses of the indexing wheel are filled with condensers, the finger 205 will withdraw slightly and open the switch contacts during periods of actual movement of the wheel, i. e. from the time that one condenser leaves the filling station until another arrives in proper position. As also explained, the contacts 192 are closed for a short interval by the operation of the advancing means at the time the condenser is brought to rest at the filling station. Thus during the period that both sets of contacts are closed, which may in fact be substantially the same period as that of closure of the contacts 192, the solenoid 184 is energized, withdrawing the arm 173 and actuating the one-revolution clutch to provide a stroke of the pumping devices and the desired pressure delivery of molten wax. Although the contacts 198 may remain closed for some little time, i. e. until the indexing wheel is again put in motion, the ratchet arm 50 will have been promptly displaced from the micro-switch 190, so that the contacts 192 stay open and the solenoid is not reenergized until another condenser is advanced to the filling station.

Although the lead wires 63, 64 on each condenser assembly can be disposed in the small notches 62 of the guide discs 60, 61 by hand or by instrumentalities other than here shown, the illustrated apparatus includes supplemental means for positively locating the wires in the notches. To that end, a pair of depressor arms 212 are carried on a horizontal shaft 214 (Figs. 1 to 4) above the conveyor structure and in such location that upon rocking the arms, i. e. counterclockwise as seen in Figs. 2 and 4, they will respectively overlie the upper outside surfaces of the guide discs 60, 61 and sweep the lead wires into the appropriate notches of the guide discs. Thus particularly where such wires may be located off-center relative to the ends of the condenser section or where they may be deformed by bends or curves, downward actuation of the arms 212 will engage the wires, so that as each arm sweeps across the outside of the adjacent guide disc, it pushes the corresponding wire upon and along the upper surface or edge of the disc, until the wires respectively seat themselves in the appropriate notches of the discs.

To operate the arms 212 in timed relation with the advancing mechanism, i. e. preferably during successive intermittent movements of the indexing wheel, a cam 215 on the shaft 42 engages a follower 216 on a pivoted rocker arm 217 which urges the follower against the cam under the tension of a stretched spring 218. The outer end of the arm 217 is pivotally connected by a long link or arm generally designated 219 to a lever arm 220 carried on the shaft 214. Although the link 219 may be a single element, it is here shown as comprising two shafts 219a and 219b overlapping side by side and spring-connected, for safety purposes only. Such connection comprises a spring 221 extending between a collar 222 fixed to the right-hand end of the shaft 219b and a second collar 224 fixed to the left-hand end of the shaft 219a; each of the collars has two holes, one for mounting the collar on an end of one shaft as stated and the other to be traversed (and to slide thereon if necessary) by the overlapping portion of the other rod. It will be understood that ordinarily this spring assembly moves as a single part, but is adapted to yield for safety when needed.

It will now be seen that when the rise of the cam 215 moves the arm 217 outwardly and thus pulls the link 219 to the right (as seen in Fig. 2) against the spring 218, the shaft 214 is rocked counterclockwise and the arms 212 are actuated to fulfill their described positioning function relative to the lead wires of the capacitor assembly which is then located at the top of the indexing wheel structure.

While other means, e. g. of manual or automatic nature, may be provided for removing the filled condensers from the wheel 44 one convenient arrangement comprises a pair of guide members 226 (Fig. 4) mounted on the table 30 and extending upwardly between the indexing wheel and the discs on each side. The members 226 have a curved under edge 227 which is so positioned that as the indexing wheel moves successive capacitors around to the lowermost position, i. e. beyond the end of the guide plate 111, the tubular surfaces of the condensers are successively engaged by the edges 227 of the members 226, and the capacitors are thereby pushed or cammed downwardly, out of the recesses 55, for example to fall through an opening 229 in the table 30 for removal in a suitable container, conveyor or the like, not shown.

It is believed that the operation of the complete machine will be readily apparent from the foregoing description of the several elements and combinations therein embodied. The capacitor assemblies, each comprising a cardboard or other tube enclosing a condenser section with its lead wires projecting therefrom, are successively fitted into the recesses of the indexing wheel, either by hand or by appropriate feeding instrumentalities, not illustrated. The indexing wheel and its attendant guide discs 60, 61 are turned by intermitent steps by means of the ratchet mechanism, advancing the capacitors through the several positioning and filling stations and finally to the ejecting station between the arms 226, the arrangement being such as to provide successive rest periods of suitable duration between the successive movements of the wheel conveyor. The non-advancing motion of the ratchet operating mechanism serves to actuate the positioning rods 92, 94, so as to center the condenser section of each successive capacitor, relative to the surrounding tube. Prior thereto, the operation of the wire positioning arms 212, as explained above, has served to seat the lead wires in the notches of the discs 60, 61.

Finally each condenser is advanced, by suitable steps, to the filling station between the blocks 110. Upon energization of the clutch operating solenoid 184, under the control of the described micro-switches 190, 196, and thus in response only to the completion of an advancing step by the wheel 44 and to the actual presence of a capacitor in position, the pumping devices are actuated to deliver a charge of molten wax of a predetermined amount simultaneously, under high pressure, into both open ends of the condenser tube. At this time the ends of the tube are effectively closed, against escape of wax (but not of air), by the cooperating surfaces of the guide discs 60, 61, and the guide plates 111. The relatively fine jets of wax from the nozzles 115 and 115a fill the cavities to be sealed, while permitting ready escape of air and thus preventing formation of air bubbles or pockets. The pumping device completes its cycle of operation after a single stroke and is not then actuated again until another capacitor assembly is in filling position. The filled condensers are thereafter advanced by several steps, with their ends still effectively closed by the described means (which may have a desired chilling effect to congeal the wax) until the ejection station is reached, whereupon the capacitors are successively removed from the conveyor structure. It will be noted that during the hot injection filling and the subsequent cooling of the filling material, the capacitor is held in a substantially constant or fixed position relative to the filling and cooling mechanism.

As also explained the several instrumentalities are capable of desirable adjustment in a variety of respects, as to the timing of each relative to the other, as to the precise amount of wax charge delivered to the ends of the condenser, and also for adaptability of the conveying, guiding, closing and filling instrumentalities to condenser assemblies of different diameters and lengths, and indeed to condenser sections (within such assemblies) of various lengths. It will be understood, of course, that once set, the machine is adapted to operate upon successive condensers of identical shape and size, but that by virtue of the described adjustments it may be reset to handle, for instance, a different batch of condensers having a shape and set of dimensions widely differing from the preceding batch. The machine is entirely automatic in respect to the several described instrumentalities, having a single driving motor, and the arrangement and nature of the elements are not only essentially simple but readily available for inspection, adjustment, or cleaning as may be necessary from time to time.

It is to be understood that the invention is not limited to the specific apparatus herein shown and described, but may be embodied in other forms without departure from its spirit as defined by the following claims.

What is claimed is:

1. In apparatus of the character described, in combination, conveyor structure for carrying to and from a filling station successive hollow-ended articles each having an appendage projecting from the vicinity of its hollow end, guide structure associated with said conveyor structure and adapted to receive and support the appendages of the articles held in the conveyor structure, means for advancing the conveyor and associated guide structure together, and means at the filling station timed with the last mentioned means for delivering a charge of fluid material into the open end of each article.

2. In apparatus of the character described, in combination, indexing means comprising a plurality of work holding devices arranged to follow a continuous path from a loading locality through a working station back to the loading locality, each said device being adapted to hold a workpiece having an appendage projecting therefrom, means associated with said indexing means to receive and support the appendages of the workpieces, and means for displacing said indexing and associated means together along said path.

3. In apparatus of the character described, in combination, an indexing wheel having a plurality of peripheral recesses for respectively holding tubular articles each having a hollow end and a wire projecting from said end, a guide wheel mounted coaxially with the indexing wheel and having a plurality of peripheral notches to receive and support the wires, feed conduit structure adjacent the periphery of the indexing wheel to direct fluid material into the open ends of successive tubular articles advanced to said conduit structure by the indexing wheel, means for intermittently advancing the indexing and guide wheels together for successively arresting the tubular articles in receiving relation to the conduit structure, and means connected to the conduit structure and timed with the advancing means, for delivering a charge of said fluid material into each article.

4. In apparatus of the character described, in combination, an indexing wheel having means about its periphery to hold a plurality of tubular articles that are hollow at both ends and that have wires respectively projecting from their ends, a pair of guide wheels mounted coaxially with the indexing wheel at opposite sides thereof and having peripheral notches to receive and support the wires, a pair of conduits disposed adjacent the periphery of the indexing wheel for directing fluid material simultaneously into both ends of a tubular article held by the wheel, means for intermittently advancing the indexing wheel and guide wheels together, and means connected to the conduits and timed with the advancing means for delivering said fluid material simultaneously through both conduits into a tubular article.

5. In apparatus of the character described, in combination, conveyor structure adapted to carry to and from a filling station successive tubular articles each open at both ends and each having a body movably positioned therein, a pair of positioning members disposed adjacent the path of said conveyor structure movable simultaneously through the opposite open ends of an article into engagement with the body disposed within the latter, said positioning means being thereby cooperatively adapted to abut both ends of the said body, means for advancing the conveyor structure, and cooperating means timed therewith for actuating the positioning members to effect abutment of same with the ends of each enclosed body for locating the latter at a predetermined position within the surrounding tubular article.

6. In apparatus of the character described, in combination, an indexing wheel having means about its periphery for holding a plurality of tubular articles open at both ends and having movable bodies contained therein, a pair of aligned positioning rods disposed on opposite sides of said indexing wheel and movable into and out of the open ends of a tubular article held by said wheel, said positioning rods being thereby cooperatively adapted to abut both ends of the said body, means for intermittently advancing the wheel and cooperating means timed with said advancing means to operate during periods of rest of the wheel, for actuating the positioning members to effect abutment of same with the ends of the enclosed body for locating the latter at a predetermined position within its tubular article.

7. In apparatus of the character described, in combination, conveyor structure for advancing to a filling station successive hollow articles each having a wire projecting from an open end thereof, associated guide means adapted to receive and support the wires, means for advancing the conveyor structure and guide means together, a depressor member movable to urge a wire into supported relation in the guide means, and means cooperating with the advancing means for actuating the depressor member.

8. In apparatus of the character described, in combination, an indexing wheel having means about its periphery to receive a plurality of members each having an open end and having a wire projecting from said end, to advance said members to a filling station, a guide wheel disposed on the side of the indexing wheel adjacent said open ends and having a plurality of peripheral notches to receive and support the wires, means for advancing the indexing wheel and guide wheel together, a depressor member associable with the guide wheel and movable to urge successive wires into supported relation in the notches, and means cooperating with the advancing means for actuating the depressor member.

9. In apparatus of the character described, in combination, an indexing wheel having means about its periphery to hold a plurality of hollow articles disposed with ends opening at one side of the wheel, a guide wheel adjacent said indexing wheel and mounted coaxially therewith, said guide wheel being disposed to be abutted by a portion of the end of each article carried by the indexing wheel, filling means disposed adjacent the indexing wheel at a predetermined locality in its path for introducing fluid material into the aforesaid open end of the article, said filling means comprising a closure plate having a curved edge conforming with the guide wheel and disposed in sliding engagement therewith, said closure plate being adapted to cover the remaining portions of the open ends of the articles carried by the indexing wheel and said guide plate having a passage therethrough for delivery of fluid material to the interior of the article.

10. In apparatus of the character described, in combination, an indexing wheel having means about its periphery to hold a plurality of hollow articles, filling means adjacent the periphery of said indexing wheel at a predetermined portion of its path, said filling means including means adapted to deliver a charge of fluid material into a hollow article disposed at said predetermined locality by the wheel, means for intermittently advancing the wheel to bring successive hollow articles to said position, said advancing means including a reciprocating member operative to move the wheel during its stroke in one direction whereby the wheel is arrested during the return stroke, and control means actuated by said reciprocating member for initiating operation of the filling means when the indexing wheel is arrested.

11. Apparatus as described in claim 10, wherein the control means comprises an electric switch disposed to be actuated by the reciprocating member at the end of its advancing stroke, and means electrically controlled by said switch for initiating operation of the filling means.

12. Apparatus as described in claim 10, wherein the filling means comprises a driving element therefor and an electrically controllable clutch for connecting said driving means therewith, and wherein the control means comprises a switch adapted to be actuated by the reciprocating member, and electrical connections intermediate said switch and said electrically controlled clutch to effect operation of the latter when the wheel is arrested with an article in position for delivery of fluid material thereto.

13. Apparatus as described in claim 10 wherein the filling means comprises driving means therefor, a clutch for connecting the driving means with the filling means to effect a predetermined operation of the latter, and electromagnetic means for actuating said clutch, and wherein the control means comprises a normally open switch disposed to be shifted to closed position by the reciprocating member at the end of its advancing stroke, a feeler device for sensing the presence of an article in the indexing wheel, to be supplied with fluid material, a second normally open switch adapted to be closed by said feeler device in response to sensing by the latter of such article, and means including connections with both said switches, for energizing the aforesaid electromagnetic means.

14. A method of filling, with thermoplastic material, the hollow open ends of a tubular article which contains a body between its ends to be sealed by said material, comprising establishing a supply of said material, moving successive articles into a filling position, simultaneously directing into both ends of the article, respective measured charges of the plastic material from the supply thereof, and advancing said filled articles beyond said filling position between end abutting closure members until said material solidifies.

15. In apparatus of the character described, in combination, an indexing wheel having means about its periphery for holding a plurality of tubular articles open at both ends and movable bodies contained therein, a pair of aligned positioning rods disposed on opposite sides of said indexing wheel and movable into and out of the open ends of a tubular article held by said wheel, means for intermittently advancing the wheel, cooperating means timed with said advancing means to operate during periods of rest of the wheel, for actuating the positioning members to locate the enclosed body at a predetermined position within its tubular article, said wheel advancing means including, a reciprocating member and ratchet means for turning the wheel upon a stroke of said member in one direction, and wherein the cooperating means comprises levers pivotally connected to the respective positioning rods to move the latter axially when the levers are rocked, and means connecting the levers with the reciprocating member to be rocked thereby during its stroke in an opposite direction.

16. In apparatus of the character described, in combination, a delivery conduit, means for intermittently advancing successive, hollow-ended articles into proximity with said delivery conduit to receive molten plastic material therefrom, said means comprising structure holding each successive article with its hollow end opening horizontally toward the delivery conduit, and said conduit having associated means substantially closing said end opening of the article around the conduit when the article is disposed in proximity to the conduit, molten plastic material supply means adapted to communicate with said delivery conduit, a reciprocating pump device connected to said supply means and delivery conduit for advancing plastic material from the supply means under pressure through the conduit, means timed with the intermittent advancing means, for actuating the pumping device when a hollow article is held adjacent the conduit by the advancing means, control means for said last-mentioned means, including, a movable feeler member adapted to engage an article advanced by the advancing means, and means controlled by said feeler member and responsive only to engagement of the latter with an article to be filled, for effecting the aforesaid actuation of the pumping device.

17. In apparatus of the character described, in combination, a delivery conduit, means for intermittently advancing successive hollow-ended articles into proximity with said delivery conduit to receive molten plastic material therefrom, said means comprising structure holding each successive article with its hollow end opening horizontally toward the delivery conduit, and said conduit having associated means substantially closing said end opening of the article around the conduit when the article is disposed in proximity to the conduit, molten plastic material supply means adapted to communicate with said delivery conduit, a reciprocating pump device connected to said supply means and delivery conduit for advancing the plastic material from the supply means under pressure through the conduit, means timed with the intermittent advancing means for actuating the pumping device when a hollow article is held adjacent the conduit by the advancing means, control means for said last-mentioned means, including, a feeler device for sensing the presence, in the advancing means, of an article to receive plastic material, a switch actuated by said feeler device, a second switch associated with the advancing means and actuated upon advance of an article into position adjacent the conduit, and means electrically controlled by said switches for effecting actuation of the pumping device only when an article is present in the advancing means and has been arrested in position to receive plastic material from the conduit.

18. A method of filling, with thermoplastic fluid material, the hollow open ends of a tubular article which contains a body between its ends to be sealed by said material, comprising, establishing a supply of thermoplastic fluid material, successively presenting said tubular articles in a horizontal position with their ends substantially closed to a filling station, projecting under pressure into said closed ends, simultaneously, respective charges of the plastic material from the supply thereof, carrying the filled articles past closure faces abutting the ends thereof, cooling said faces to harden the supplied thermoplastic material and separating the articles from said faces.

19. In apparatus of the character described, in combination, means for holding a tubular article hollow at both ends that is to receive a charge of liquid plastic material in each such end, a pair of conduits disposed adjacent said ends of an article held by the first mentioned means to direct liquid plastic material into both ends of the article, plastic material supply means adapted to communicate with said conduits, pumping means for advancing material from the supply means to the conduits including a pair of cylinders respectively associated with the conduits, a pair of plungers respectively movable in the cylinders, a crosshead for the plungers, a drive shaft, means eccentrically connecting said drive shaft with said crosshead to reciprocate the plungers together, and means for adjusting said connecting means to change its eccentricity and thereby to adjust simultaneously the length of stroke of both plungers, and means for actuating the pumping means to effect delivery of a single predetermined charge of the liquid plastic material respectively through each of the conduits which fills said ends of the article.

FELIX WEISS.

REFERENCES CITED

The following references are of record in the file of this patent:

UNITED STATES PATENTS

| Number | Name | Date |
|---|---|---|
| 452,599 | Dooley | May 19, 1891 |
| 791,648 | Richards | June 6, 1905 |
| 1,477,499 | Johnson | Dec. 11, 1923 |
| 1,745,482 | Goodwin | Feb. 4, 1930 |
| 2,076,412 | Oldham | Apr. 6, 1937 |
| 2,087,809 | Nichols et al. | July 20, 1937 |
| 2,327,113 | Krotz | Aug. 17, 1943 |
| 2,345,917 | Coffman | Apr. 4, 1944 |
| 2,389,705 | Wetzel | Nov. 27, 1945 |
| 2,411,398 | Wallace | Nov. 19, 1946 |
| 2,419,484 | Danziger | Apr. 22, 1947 |
| 2,461,723 | Cowan | Feb. 15, 1949 |
| 2,485,772 | Pool | Oct. 25, 1949 |